(12) United States Patent
Ambardekar

(10) Patent No.: US 7,827,956 B2
(45) Date of Patent: Nov. 9, 2010

(54) REVOLVING PISTON INTERNAL COMBUSTION ENGINE

(76) Inventor: Vishvas Ambardekar, Plot No B 82 Flat No. 1, Tulshibagwale Colony, Sahakar, Nagara N2, Pune (IN)

( * ) Notice: Subject to any disclaimer, the term of this patent is extended or adjusted under 35 U.S.C. 154(b) by 372 days.

(21) Appl. No.: 11/856,263

(22) Filed: Sep. 17, 2007

(65) Prior Publication Data
US 2009/0133665 A1 May 28, 2009

Related U.S. Application Data

(63) Continuation-in-part of application No. 10/545,251, filed as application No. PCT/IN03/00025 on Feb. 13, 2003, now abandoned.

(51) Int. Cl.
*F02B 53/00* (2006.01)
(52) U.S. Cl. ............... 123/245; 418/36; 418/37; 74/437
(58) Field of Classification Search ........... 123/241, 123/245; 74/434, 437; 418/35–38
See application file for complete search history.

(56) References Cited

U.S. PATENT DOCUMENTS

| | | | | |
|---|---|---|---|---|
| 957,631 A | | 5/1910 | Stewart | |
| 1,329,625 A | * | 2/1920 | Noble | 418/36 |
| 1,370,548 A | * | 3/1921 | Neebe | 418/36 |
| 1,701,534 A | * | 2/1929 | Knopp | 418/36 |
| 2,071,528 A | | 2/1937 | Hover | |
| 2,075,654 A | | 3/1937 | Martin | |
| 3,034,486 A | * | 5/1962 | Buxton | 418/36 |
| 3,769,946 A | | 11/1973 | Scherrer | |
| 4,010,716 A | * | 3/1977 | Minka | 123/245 |
| 4,646,694 A | | 3/1987 | Fawcett | |
| 4,901,694 A | | 2/1990 | Sakita | |
| 5,133,317 A | | 7/1992 | Sakita | |
| 5,433,179 A | | 7/1995 | Wittry | |
| 6,305,345 B1 | | 10/2001 | Bakhtine et al. | |
| 6,446,595 B1 | * | 9/2002 | Sakita | 123/245 |
| 6,457,452 B1 | | 10/2002 | Sakita | |
| 6,691,647 B2 | | 2/2004 | Parker et al. | |
| 6,895,922 B1 | * | 5/2005 | Stoughton et al. | 123/241 |
| 2006/0150947 A1 | | 7/2006 | Ambardekar | |

FOREIGN PATENT DOCUMENTS

| | | |
|---|---|---|
| JP | 358079623 A | 5/1983 |
| JP | 360109636 | 6/1985 |
| JP | 402308923 A | 12/1990 |
| WO | WO-0079102 A1 | 12/2000 |

* cited by examiner

*Primary Examiner*—Thomas E Denion
*Assistant Examiner*—Mary A Davis
(74) *Attorney, Agent, or Firm*—Gifford, Krass, Sprinkle, Anderson & Citkowski, P.C.

(57) ABSTRACT

A revolving piston engine incorporating revolving pistons for improving fuel efficiency, increasing power output, easy cooling and reduced vibration. One or more of revolving piston pairs, each consisting of one piston and one cylinder head, revolve within a ring cylinder, around a common axis in a same direction, but with different velocities. A revolving piston compressor is also disclosed, incorporating appropriately designed and relocated ports/valves for both of associated intake and outlet components.

20 Claims, 11 Drawing Sheets

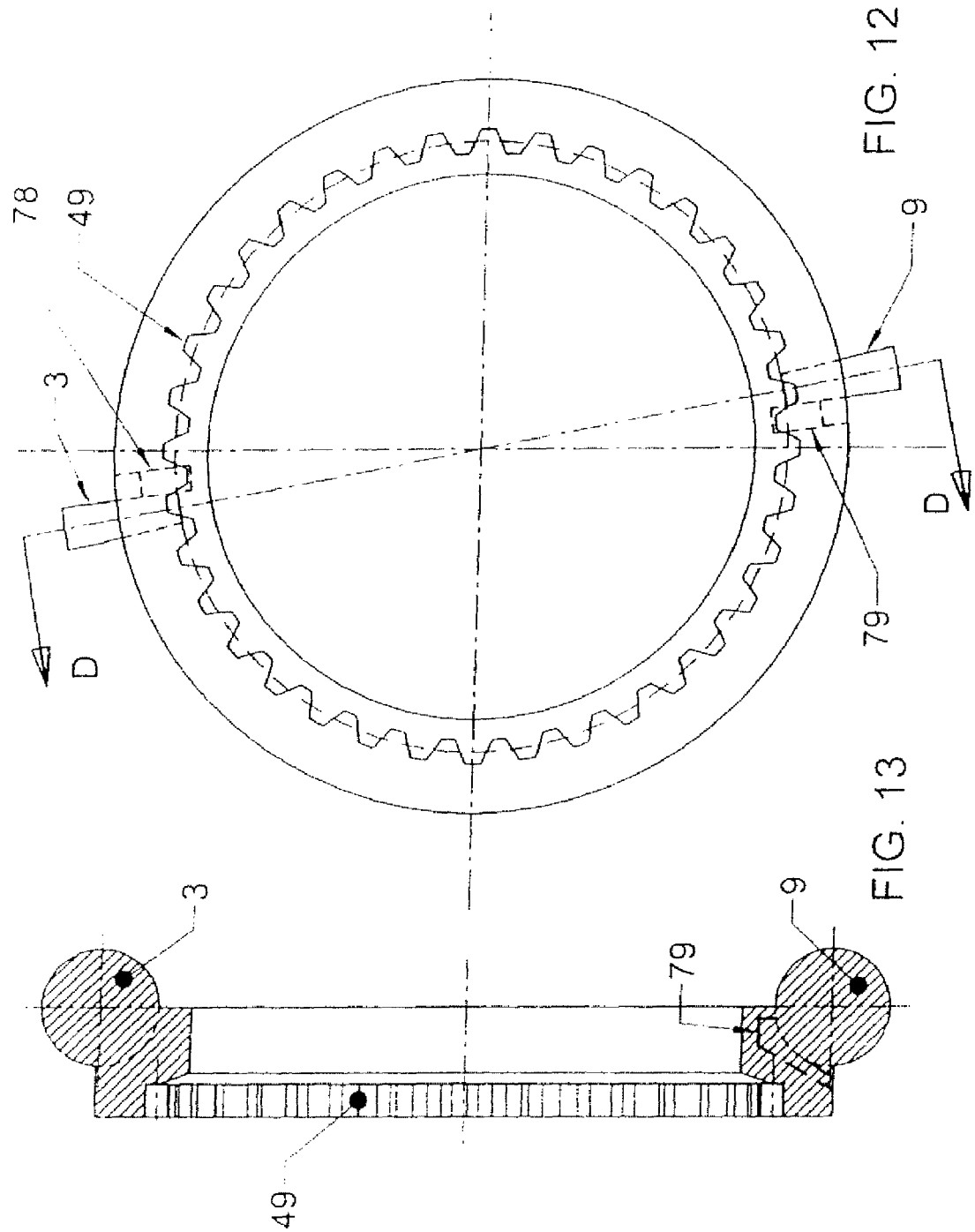

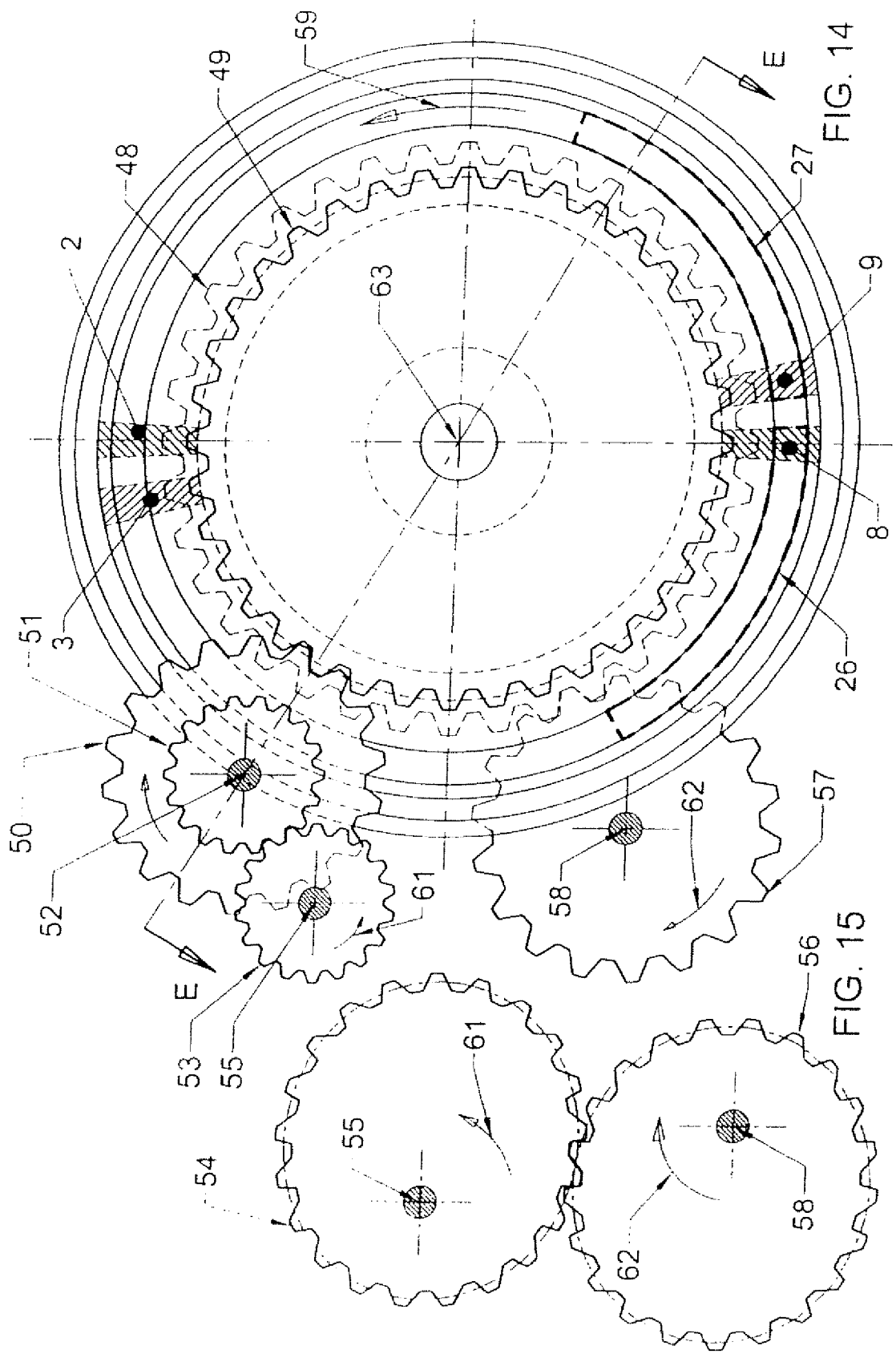

REVOLVING PISTON INTERNAL COMBUSTION ENGINE

CROSS-REFERENCE TO RELATED APPLICATIONS

This application is a continuation-in-part of U.S. patent application Ser. No. 10/545,251 filed Aug. 10, 2005, now abandoned which is a U.S. National Phase of PCT Application No. PCT/IN03/00025 filed Feb. 13, 2003 and entitled "Revolving Piston Internal Combustion Engine".

FIELD OF THE INVENTION

The present invention discloses a revolving piston engine incorporating dual revolving pistons for improving fuel efficiency, increasing power output, easy cooling and reduced vibration. One or more of revolving piston pairs, each consisting of one piston and one cylinder head, revolve within a ring cylinder, around a common axis in a same direction, but with different relative velocities. A revolving piston compressor is also disclosed, incorporating appropriately designed and relocated ports/valves for both of associated intake and outlet components.

BACKGROUND OF THE INVENTION

Conventional internal combustion engines are well known and widely used in day-to-day life, these typically consisting of a cylinder, a crank, a connecting rod and a piston. These reciprocating piston engines are further designed with different capacities and for various applications using different types of fuels.

In an attempt to reduce "work loss" (this generally being defined to encompass any component of energy associated with the combustion cycle in the piston and valve arrangement and which is dissipated into some other form outside of output energy delivered to the vehicle crank) associated with such reciprocating piston engines, different types of engines have been produced, both with and without a reciprocating piston. Most notable among these are rotary engines.

One such well know effort is the Wankel engine, and which was designed with a rotary piston, that rotates continuously in one direction, thus reducing the losses which otherwise would have caused by the reciprocating motion of the piston in a conventional reciprocating piston internal combustion engine. In the Wankel engine, the four strokes of a typical Otto cycle occur in the space between a rotor, which is roughly triangular, and the inside of an associated housing, in the basic single-rotor Wankel engine, the oval-like housing surrounds a three-sided rotor. A central drive shaft, also called an eccentric shaft, passes through a center of the rotor, and is supported by bearings.

In operation, the rotor both rotates around an offset lobe (or crank) located on the eccentric shaft, thus creating orbital revolutions around the central shaft. Associated seals located at the corners of the rotor seal against the periphery of the housing, thus dividing it into three continuously moving combustion chambers. Fixed gears mounted on each side of the housing engage with ring gears attached to the rotor, and to ensure the proper orientation as the rotor moves.

During concurrent rotation and orbital revolution, each side of the rotor alternates in its position (i.e. closer and farther) relative to the wall of the housing, thus compressing and expanding the combustion chamber in a fashion similar to the strokes of a piston in a reciprocating engine, and with the power vector of the combustion stage traveling through the center of the offset lobe.

In contrast to a standard four stroke reciprocating piston engine producing one combustion stroke per cylinder for every two rotations of the crankshaft (that is, one half power stroke per crankshaft rotation per cylinder), each combustion chamber in the Wankel generates one combustion stroke per each driveshaft rotation, i.e. one power stroke per rotor orbital revolution and three power strokes per rotor rotation. Accordingly, the power output of the Wankel engine is generally higher than that of a four-stroke piston engine of similar physical dimension and size.

Wankel engines have several major advantages over reciprocating piston designs, in addition to having higher output for similar displacement and physical size, most notably including being considerably simpler with far fewer moving parts. The elimination of these parts not only makes a Wankel engine much lighter (typically half that of a conventional engine of equivalent power), but it also completely eliminates the reciprocating mass of a piston engine, with its internal strain and inherent vibration due to repeated acceleration and deceleration, thereby producing not only a smoother flow of power but also the ability to produce more power by running at higher revolutions per minute (rpm).

Corresponding disadvantages of Wankel style engines include, and in comparison to standard four cycle piston engines, the time available for fuel to be injected into the Wankel engine being significantly shorter, and again due to the way the three chambers rotate. Also, the fuel-air mixture cannot be pre-stored, as there is no intake valve and which means that, in order to obtain acceptable performance out of a Wankel engine, more complicated fuel injection technologies are required than for regular four-stroke engines. Also, the difference in intake times causes Wankel engines to be more susceptible to pressure loss at low RPM compared to regular piston engines. Also, and in terms of fuel economy, Wankel engines tend to be generally less efficient than four stroke piston engines.

Problems also occur with exhaust gases at a peripheral port exhaust, where the prevalence of hydrocarbon can be higher than from the exhausts of regular piston engines. Given the above considerations associated with Wankel engines, appropriate cooling and sealing have become very difficult and probably for these reasons the engine has not become very popular in industries.

An example of another type of rotary engine, drawn from the prior art, is set forth in U.S. Pat. No. 5,133,317, issued to Sakita, and which discloses a rotary piston engine incorporating a housing having a cylindrical shaped working chamber with inlet and exhaust ports. First and second piston assemblies are provided, each of which includes one or more pairs of diametrically wedge shaped pistons located within the working chamber. The piston assemblies rotate in a same direction and at recurrently variable speeds, such that one pair of diametrically opposite sub-chambers decreases in volume, with the other pair correspondingly increases in volume.

Reference is also made to the engine and drive system set forth in U.S. Pat. No. 6,691,647, issued to Parker, and which teaches an engine having four open-ended curved cylinders disposed in a toroidal arrangement with respect to a central pivot point. Two piston arms are pivoted about the central pivot point, the two arms carrying at opposite ends of each a total of four pistons. Each piston exhibits two faces and, in mounting on the piston arm ends, faces tangentially one away from the other for alternate engagement with adjacent ends of two of the cylinders.

Gas turbine technology is another type of non-reciprocating piston engine application and which is in fairly wide use, although not presently in most vehicular applications. A gas turbine extracts energy from a flow of hot gas produced by combustion of gas or fuel oil in a stream of compressed air. Turbines typically incorporate an upstream air compressor (radial or axial flowing), and which is mechanically coupled to the downstream turbine (this also generally defined by a plurality of radially extending and centrifugally driven blade element), with a combustion chamber in between.

In this fashion, energy is released when compressed air is mixed with fuel and ignited in the combustion chamber. The resulting gases are directed over the turbine's blades, thereby spinning the turbine and mechanically powering the compressor. In a final step, the gases are passed through a nozzle, generating additional thrust by accelerating the hot exhaust gases by expansion back to atmospheric pressure.

Energy from a turbine engine is extracted in the form of shaft power, compressed air and thrust, in any combination, and used to power such as aircraft, trains, ships, electrical generators and, in regards to land operated vehicles, such as military tanks. Given that gas turbines exhibit very high values of power to weight ratio, and work most efficiently at very high speeds, this renders them for the most part not practical in use with automobiles.

SUMMARY OF THE INVENTION

The present invention discloses a revolving piston engine for reducing losses associated with conventional reciprocating piston engine, and which further provides easier and improved sealing and cooling properties, lower vibration and reduced power losses properties, in comparison to other prior art rotary piston engine designs.

The present invention incorporates any number of piston and cylinder head pairs, such as a twin piston variant in a disclosed embodiment, incorporated within an outer ring gear exhibiting a plurality of internal teeth, and within which are mounted elliptical and circular gear pairs. In another variant, the selected elliptical gears can be substituted by double crank mechanism. Applications include use in automobiles, power generation, aero industries, battlefield tanks, among other applications. The same concept, with appropriate design changes, can be used to develop a revolving piston air compressor.

BRIEF DESCRIPTION OF THE DRAWINGS

Reference will now be made to the attached drawings, when read in combination with the following detailed description, wherein like reference numerals refer to like parts throughout the several views, and in which:

FIG. 12 is another schematic illustration of the ring gear assembly shown in FIG. 4, with revolving pistons and schematic ring gear, again further shown with internal gear teeth, a pair of schematically illustrated openings connected a space between revolving piston and revolving cylinder head to the pair of ports (see again FIG. 4);

FIG. 13 is a schematic sectional view of the ring gear assembly in FIG. 12 and as shown in cutaway along line D-D;

FIG. 14 is a schematic representation of an equivalent revolving piston engine, such as shown in FIG. 4 and according to a further variant showing a probable gear arrangement and direction of motion of various main components;

FIG. 15 is a sectional illustration of an elliptical gear pair rigidly connected to the coaxial circular gears associated with FIG. 14;

DETAILED DESCRIPTION OF THE PREFERRED EMBODIMENTS

A detailed description of the various embodiments of the present invention will now be provided, beginning with that of the various engine components associated with the revolving piston internal combustion engine. Before proceeding with a detailed description, the following definitions are referenced as relevant to and in cooperation with an explanation of the present inventions, namely:

Pitch ellipse: This is a mathematical ellipse that is used as a base for making an elliptical gear. When two elliptical gears are in meshing engagement, the pitch ellipse(s) corresponds to the respective elliptical gears "roll" over each other. In application, pitch ellipses are used for kinematic calculations.

Focus of ellipse: There are two such points, on the major axis of every ellipse and which are symmetrical about a minor axis of the ellipse. The summation of the distances from both of its focuses to any point on the ellipse is always equal to the length of its major axis.

Figure 1:
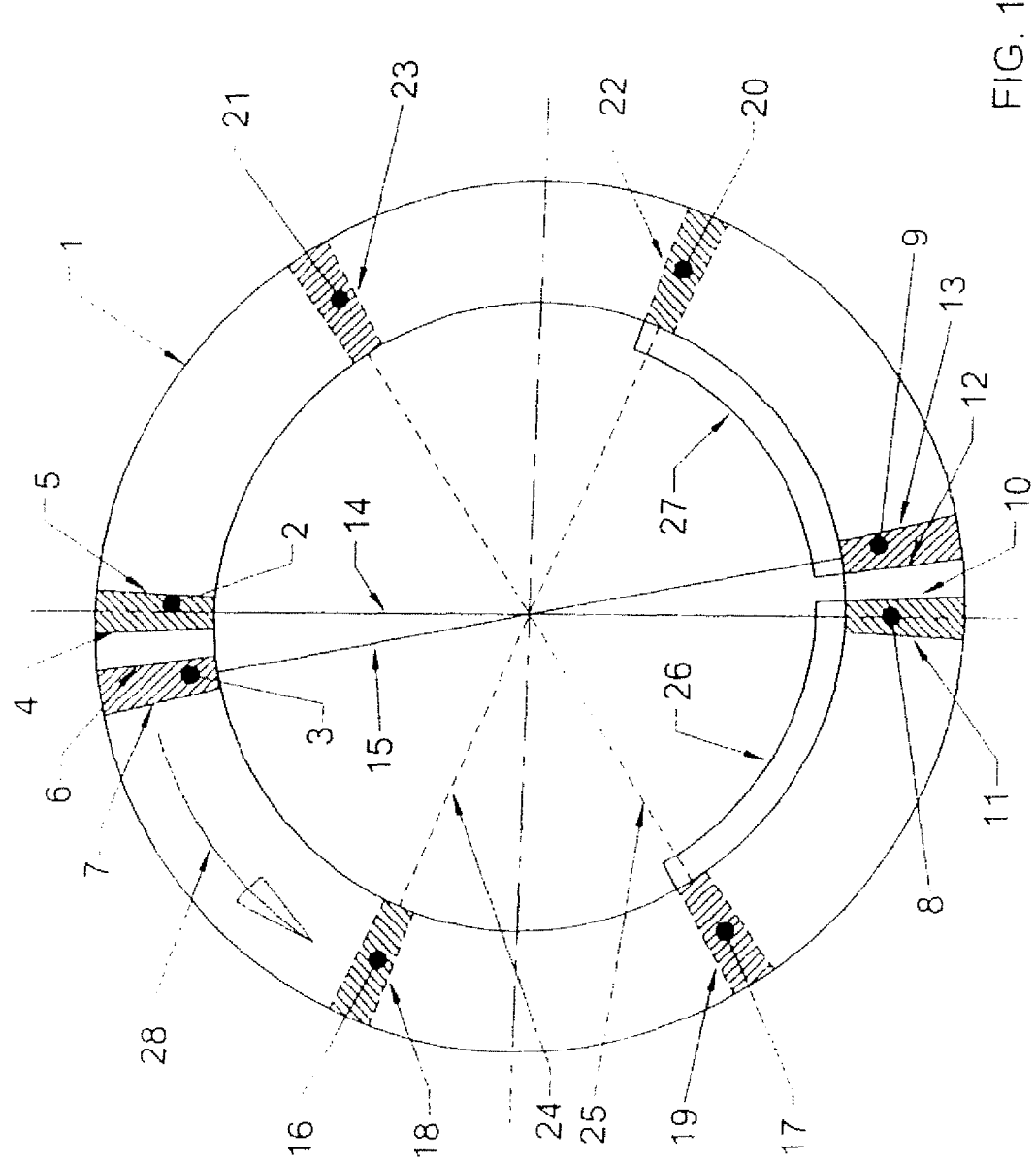
FIG. 1 is a schematic representation of the twin piston, "revolving piston engine" showing the probable locations of the inlet and exhaust ports and also showing both top dead center (TDC) and bottom dead center (BDC), in dotted illustration, equivalent positions for the engine.
Figure 5:
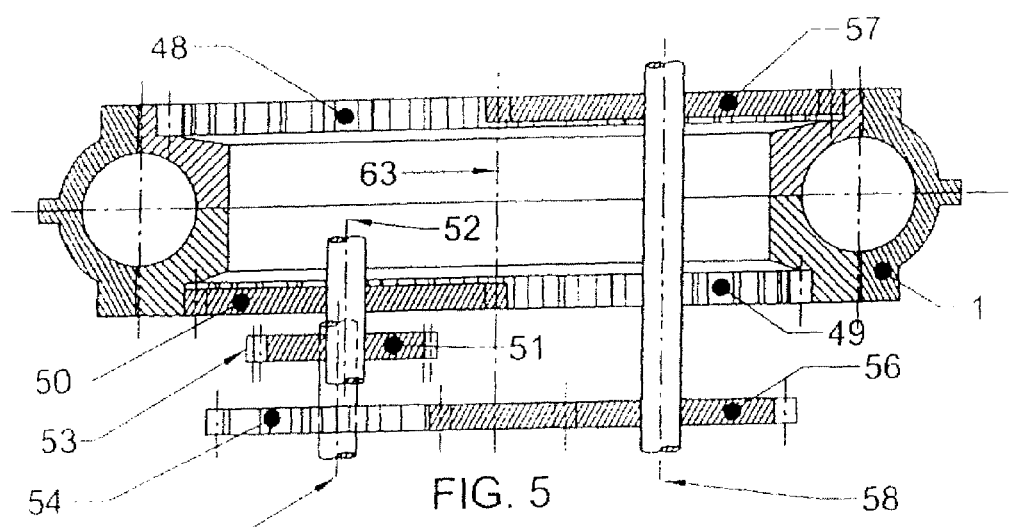
FIG. 5 is a cutaway illustration taken along line A-A in FIG. 4 and showing the arrangement of the various components and gears.

Hollow Ring Cylinder:

A hollow circular ring is shown in schematic fashion in FIG. 1 as well as in cutaway view in FIG. 5. The ring 1 may exhibit any suitable cross-section, and which has a common axis, outside the cross-section of which renders the ring 1 with a substantially circular geometric shape.

The hollow ring 1 is analogous to the cylinder of a conventional reciprocating piston engine, in which the piston slides and may exhibit any cross-sectional shape in order to provide ease of sealing and ease of manufacturing. The ring cylinder 1 may also be made of many parts joined together, or otherwise casted or machined from one or more integrally formed pieces.

The ring cylinder 1 has two main components, one is fixed (see as also referenced at 1 in FIG. 5) and the other is revolving (at 48 and 49 in FIG. 5). The revolving component consists of two assemblies revolving around the common axis that passes through its center 63 (FIG. 4), of the ring cylinder. These two revolving ring gear assemblies, as also represented by 48 and 49 in FIG. 4, revolve at different angular speeds and are coupled to each other with a mechanism that regulates the differential angular speed.

Revolving Pistons:

Referring again to FIG. 1, two revolving pistons are represented at 3 and 9, in one position, and at 17 and 21, in another position. The revolving pistons slide within the ring cylinder 1, and thus revolve around the common axis that passes through the center of the ring cylinder 1. For purposes of identification piston pairs 2, 3 and 8, 9 are intended to also signify a pair of respective revolving pistons and associated/ mating revolving cylinder heads.

The revolving pistons are arranged in diametrically opposite fashion relative to each other, and are connected to the ring gear assembly 49. For purposes of definition, ring gear assemblies 15 and 19 are also identified as revolving assemblies. The shaping associated with the revolving pistons is further intended to complement the sealing requirements associated with the cross-sectional configuration of the ring cylinder 1, and as these are analogous to the features of the piston associated with a the conventional reciprocating piston engine, referenced hereinafter here as pistons instead of revolving pistons.

Revolving Cylinder Head:

Referencing again FIG. 1, two revolving cylinder heads are represented by 2 and 8, in one position and by 16 and 20, in another position. These are very similar to the pistons however, mimic cylinder heads associated with a conventional reciprocating piston engine.

Figure 4:
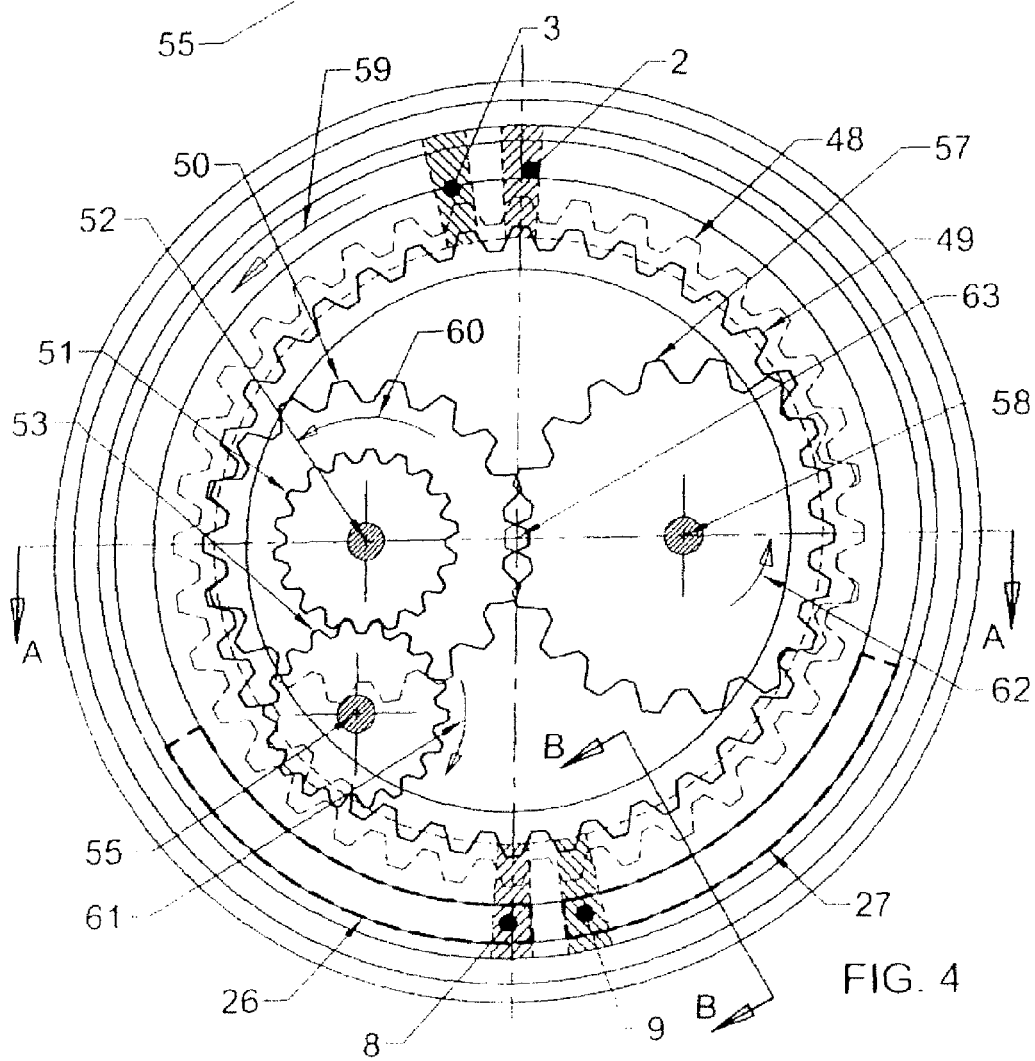
FIG. 4 is a further schematic representation of the revolving piston engine showing the probable gear arrangement and the direction of motion of the various main components.
Figure 6:
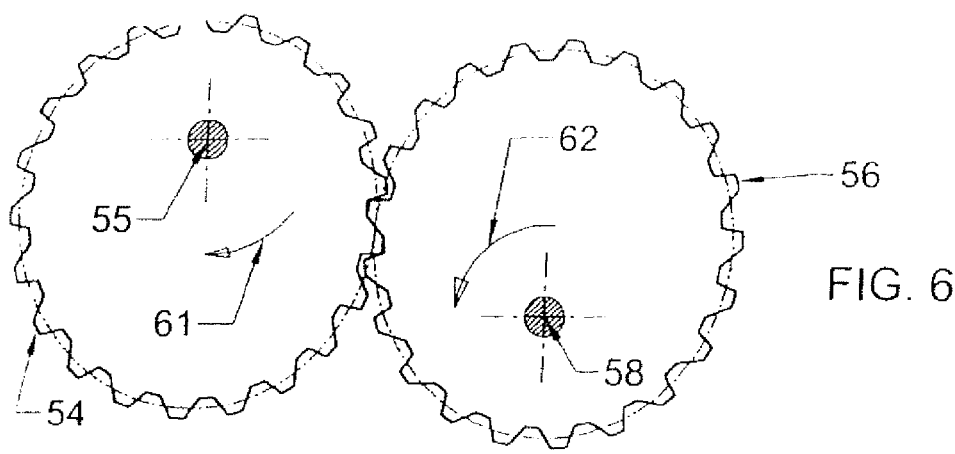
FIG. 6 is a sectional illustration of an elliptical gear pair, and which is rigidly connected to the coaxial circular gears shown in FIG. 4.

The revolving cylinder heads slide in the ring cylinder 1, and thus revolve around the common axis that passes through the center of the ring cylinder. As best shown in FIG. 4, the revolving cylinder heads are diametrically opposite to each other and are connected to the ring gear assembly 48. The shaping of the revolving cylinder heads, similar to that of the revolving pistons, is intended to suit the sealing requirements of the ring cylinder 1. These revolving cylinder heads are analogous to the cylinder head of a conventional reciprocating piston engine, as the active volume is trapped between the piston and these parts and, accordingly, hereafter these parts are referred to as cylinder heads instead of revolving cylinder heads.

Ring Gear Supporting the Revolving Pistons:

As shown throughout the present illustrations, the ring gear assembly may be incorporated with either internal or external configured gear teeth. In the illustrated embodiment, again referencing FIG. 4, the ring gear-3 is illustrated as exhibiting internal gear teeth and with the pistons 3/9 and 17/21 being mounted thereupon.

The ring gear may also form a portion of the inner walls of the ring cylinder 1 and to be free to revolve around the common axis that passes through the center of the ring cylinder. As again shown at 49 in FIG. 4, the ring gear is also represented in FIG. 1 at positions 15 and 25, representing the ring gear 49 as a rigid link in two of its different positions.

Ring Gear Supporting the Revolving Cylinder Heads:

This is another ring gear assembly with either internal or external configured gear teeth. According to the present illustrations, the ring gear-2 is also chosen to have internal gear teeth, with the cylinder heads mounted upon the ring gear. The ring gear may also define a portion of the inner walls of the ring cylinder 1, and to be free to revolve around the common axis that passes through the center of the ring cylinder. As shown again at 48 in FIG. 4 this ring gear is also referenced. In FIG. 1 at 14 and 24, and represents as a rigid link in two of its different positions.

Linkage to Constrain the Movement of the Two Ring Gears:

A linkage component influences the velocity profile of the ring gear-2, with respect to that of ring gear-1. In the preferred embodiment illustrated, two elliptical gears are shown in meshing engagement, with their axes of rotation passing through a geometric focus point of their respective pitch ellipses, used for the linkage purpose.

In addition, a few circular gears may be used in series to obtain the direction of rotation and the overall speed ratio as desired. With this linkage, it should be possible to rotate both the ring gears in same direction, with varying speed of ring gear-2 for a constant speed of ring gear-1 and keeping same period for both the ring gears to complete their one revolution. It is possible to use other linkages for obtaining the desired varying speeds; one such linkage could be a four bar linkage operating as double crank mechanism.

Figure 2:
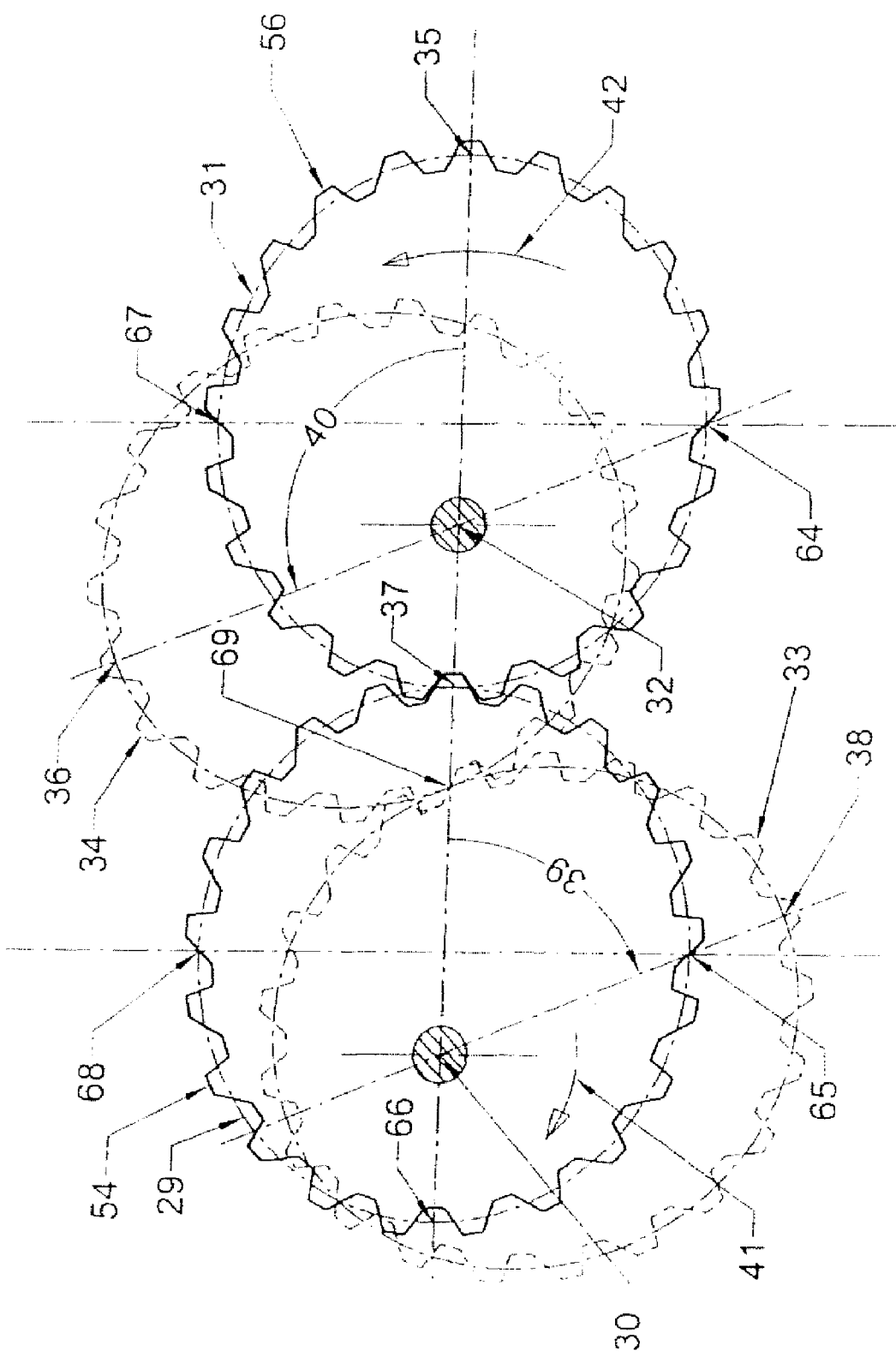
FIG. 2 is a sectional illustration of pitch ellipses associated with the elliptical gear pair, and in order to maintain a varying speed ratio between the revolving piston and the revolving cylinder head.

Principle of Operation:

To understand the operation of the engine, it is necessary first to understand the functioning of the two elliptical gears. The pitch ellipse (both pitch ellipses being identical) used for the two elliptical gears has an eccentricity of approximately 0.38. Items 29 and 31, in FIG. 2, represent the elliptical gears with their axes of rotation passing through their respective focal points further shown at 32 and 30.

Figure 3:
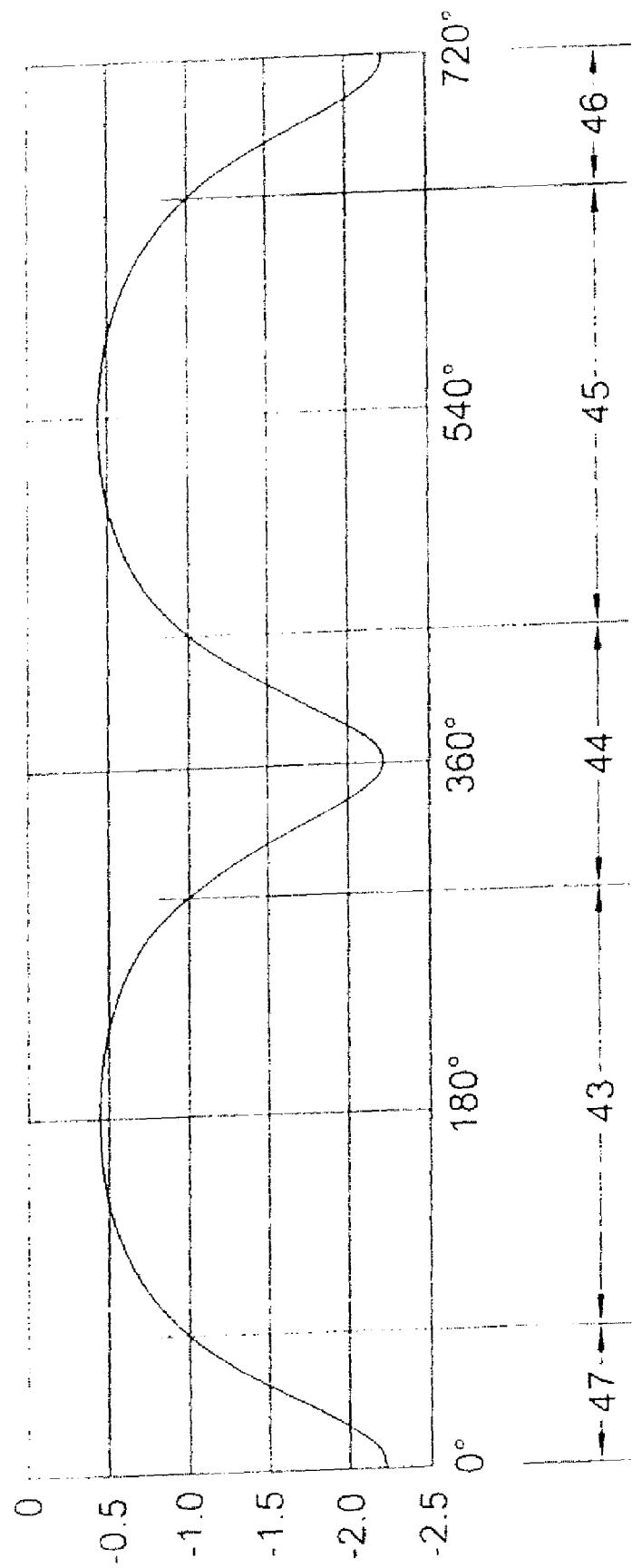
FIG. 3 is a graphical illustration of a curve showing the relationship between instantaneous speed ratio of the interengaging elliptical gears in FIG. 2, from 0° to 720° (two cycles of rotation) and in a counterclockwise direction, the negative values in the curve representative of the face that the two gears rotate in opposite direction.

The instantaneous speed ratio between gear 31 to gear 29, with respect to rotation 39 (again FIG. 2) of the gear 29 in direction shown by 41, is plotted in FIG. 3. A further rotation (at 40 in FIG. 2) of gear 31, corresponding to the rotation 39 of gear 29, can further be calculated from the geometry of the pitch ellipses.

In FIG. 3, the horizontal axis represents the rotation 39 of gear 29 in direction 41 from 0° to 720°, and the vertical axis represents the instantaneous speed ratio between gear 31 to gear 29. It can be seen from FIG. 3 that the speed ratio varies approximately from −2.22 to −0.45. The negative speed ratio indicates that the direction of rotation 42 of gear 31 is opposite to direction of rotation 41 of gear 29.

As both the elliptical gears are identical, they have equal number of teeth and thus simultaneously complete their one revolution. In FIG. 3, it can be seen that at points the speed ratio obtained is unity, at that moment both the elliptical gears rotate at the same instantaneous speed. These positions of the two ring gears, when the speed ratio is unity, are analogous to the TDC and BDC positions in the conventional reciprocating piston engine.

The piston and corresponding cylinder head are at closest and farthest to each other in these positions of TDC and BDC respectively. It is further noted that, with reference again to FIG. 2, the distance between the two focal points, 30 and 32, as well as between corresponding axes of rotation, is equal to the length of the major axis of the pitch ellipse.

Engine Kinematics Construction:

The engine has one hollow ring cylinder, represented again at 1 in FIG. 1, consisting of fixed and revolving parts (see again 1 and 48, 49 as referenced in the side cutaway of FIG. 5). The fixed part of the ring cylinder is used for providing cooling to the cylinder and also has both an intake port 27 and an exhaust port 26, connected to it (see also FIG. 4).

The revolving parts of the ring cylinder are mainly made of two ring gears, namely ring gear-1 and ring gear-2. These ring gears also form a part of the inner walls of the ring cylinder. The pistons and the cylinder heads are integral parts of the ring gears assemblies and thus the ring gears revolve with the pistons and the cylinder heads respectively.

As the ring gears revolve with the piston and the cylinder heads, proper design of these ring gears can make sealing of the piston and cylinder heads less difficult. The ring gear 49, which has internal teeth, is connected with a spur gear 50 (again FIGS. 4 and 5) with a speed ratio of 1:2. This spur gear has a fixed axis 52, and has another coaxial gear 51 rigidly connected to it.

The coaxial gear 51 drives another spur gear 53, with a speed ratio of unity, having another fixed axis 55. Gear 53 has an elliptical gear 54 rigidly connected to it with an axis 55 passing through the focus of the pitch ellipse of the elliptical gear 54. The elliptical gear 54 drives another elliptical gear 56, which has its fixed axis of rotation 58 passing through the focus of its pitch ellipse.

The elliptical gear 56 is rigidly connected to a coaxial spur gear 57, and which in turn drives the ring gear-2. The speed ratio between the spur gear 57 and ring gear-2 is, in the embodiment illustrated 2:1.

A flywheel, not shown in the figures, of appropriate size is provided and connected to the ring gear-1, that support the revolving pistons. Thus the ring gear-1 rotates at half the speed of the elliptical gear 54 and the ring gear-2 rotates at half the speed of the elliptical gear 56.

The full gear train ensures that ring gear-1 and ring gear-2 rotate in the same direction. As shown in FIG. 4, arrows 59, 60, 61 and 62 show the direction of rotation of different gears. The elliptical gears 54 and 56 are assembled in such a way that they have instantaneous speed ratio of unity when the pistons and the corresponding cylinder heads are closest to each other and the speed of the elliptical gears 56 is tending to reduce as compared to the speed of gear 54 as the gears rotate in the direction shown by 62 and 61, i.e. as the ring gears rotate in the direction shown by 59.

It should be further stated that the linkage utilized here includes all the gears for motion transfer from the ring gear-1 to ring gear-2 make a positive drive, and in order to provide non-slip motion. Thus, the ring gear-1 drives the ring gear-2 with the desired speed variation.

The elliptical gears 54 and 56 in mesh thus ensure the differential speeds between pistons and the cylinder heads. It is important to note that the linkage with elliptical gears can be replaced by some other linkage; one such possible linkage including a four bar linkage operating as double crank mechanism (as will be described in more detail in reference to FIGS. 7 and 8).

Figure 7:
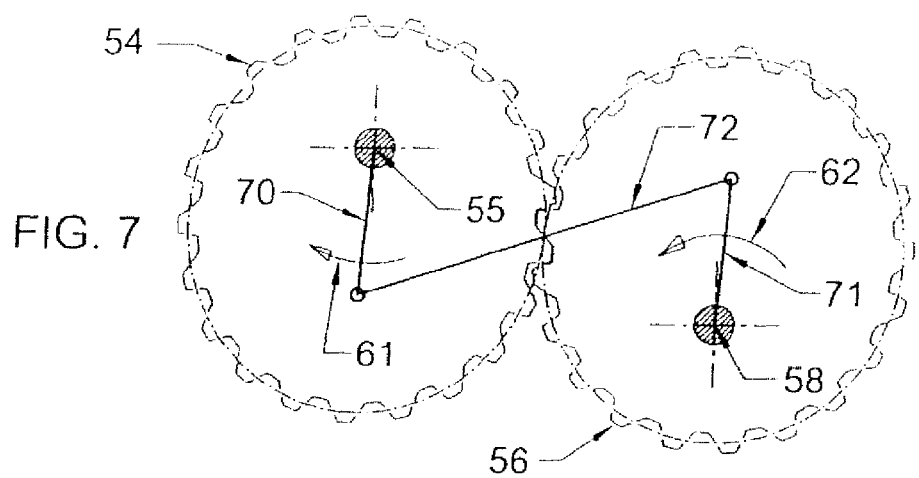
FIG. 7 is an illustration of a double crank mechanism with two cranks and a coupler link, shown in replacement of the two elliptical gears, the first and second cranks replacing the plurality of two elliptical gears previously disclosed in the variant of FIG. 4.

Specifically, and as is shown in FIG. 7, a double crank mechanism with cranks 70 and 71 are illustrated with interconnecting coupler link 72. This is in replacement of the two elliptical gears previously illustrated at 54 and 56 in the embodiment of FIGS. 4 and 5, and which are referenced in broken lines. The crank 70 replaces the elliptical gear 54, thus being rigidly connected to the gear 53. The crank 71 further replaces the elliptical gear 56, thus being rigidly connected to gear 57.

Figure 8:
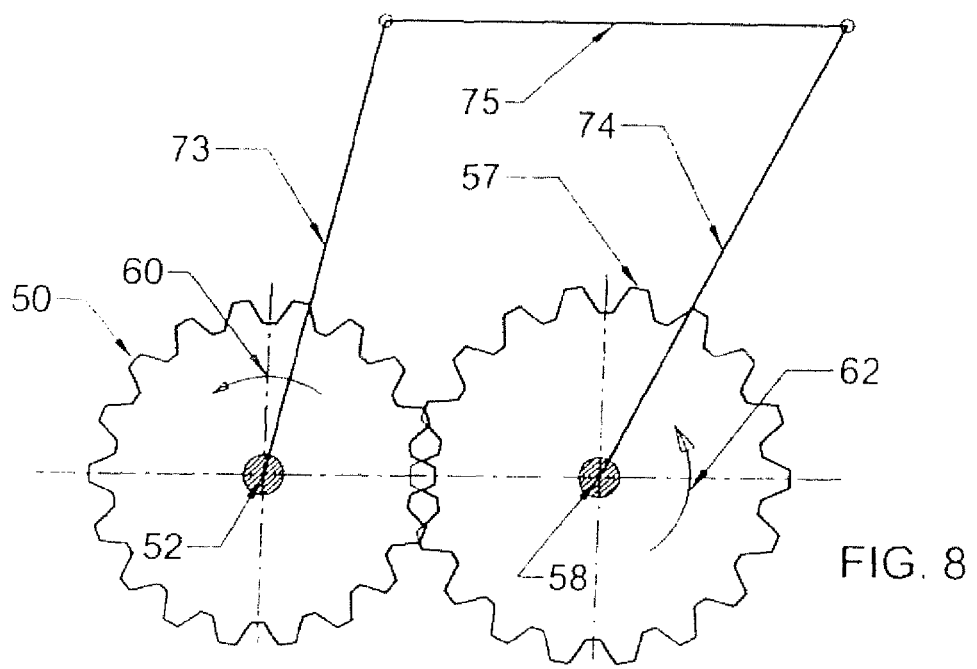
FIG. 8 illustrates another double crank mechanism and coupler link replacing the two elliptical gears and according to another variant of the present inventions.

As further referenced in FIG. 8, another variation of a double crank mechanism is provided and illustrating cranks 73 and 74 with interconnecting coupler line 75 (this in replacement again of the elliptical gears 54 and 56). As the cranks 73 and 74 revolve in a same direction, they are coaxially and rigidly connected to the gears 50 and 57, respectively, and without the need of gear 53 and meshing gear 51. Also, an output shaft, which is also not shown, is connected to the ring gear-1 and operates in a fashion as conventionally known in the art.

Figure 10:
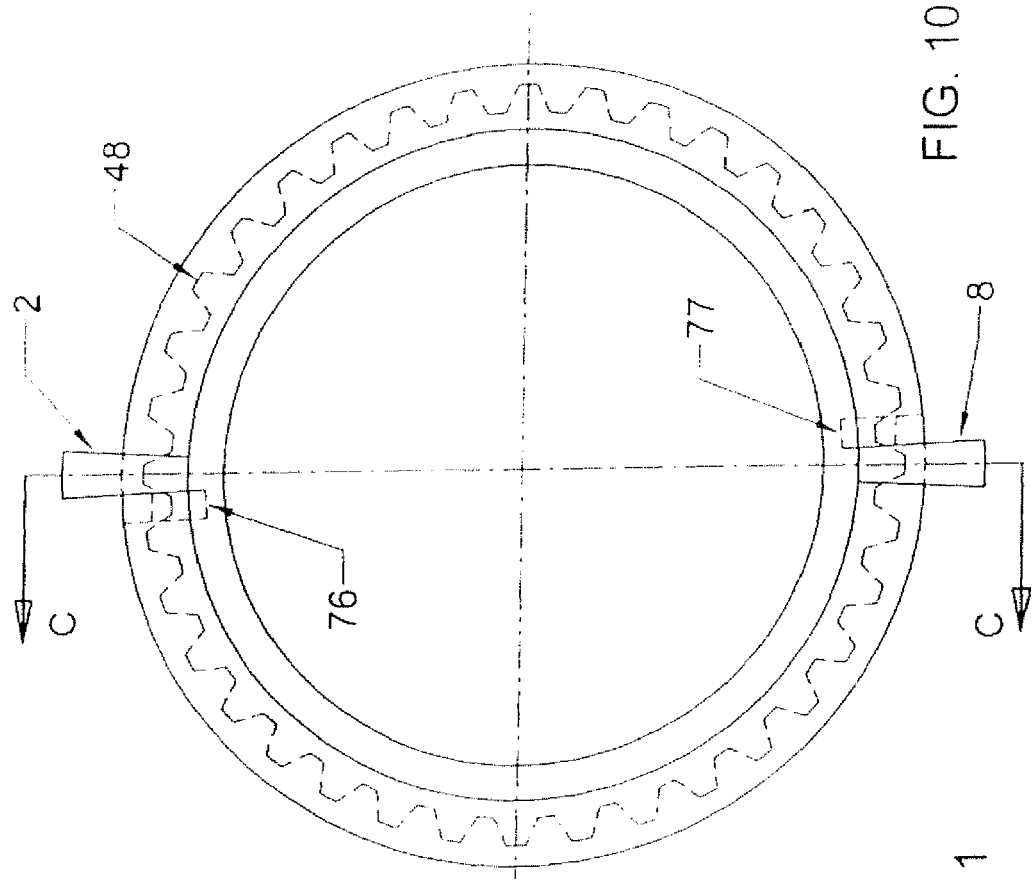
FIG. 10 is a schematic of the ring gear assembly shown in FIG. 4, with revolving cylinder heads and schematic ring gear, which is shown with internal gear teeth. Schematic openings are shown to connect the space between revolving piston and revolving cylinder head to a pair of ports.
Figure 9:
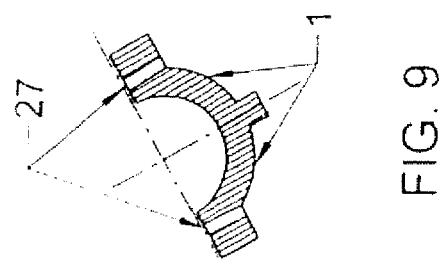
FIG. 9 is a partial cutaway B-B of FIG. 4, and illustrating a cross-sectional cutaway of the fixed ring cylinder.

As again illustrated in FIG. 9, a partial cutaway B-B of FIG. 4 illustrates a cross-sectional cutaway of the fixed ring cylinder 1 and in particular referencing the selected ports 27. Further shown in FIG. 10 is a schematic of the ring gear assembly, as shown in FIG. 4, with revolving cylinder heads 2 and 8 and schematic ring gear 48, which is shown with internal gear teeth. Schematic openings 76 and 77 are shown to connect the space between revolving piston and revolving cylinder head to the pair of ports 26 and 27.

Figure 11:
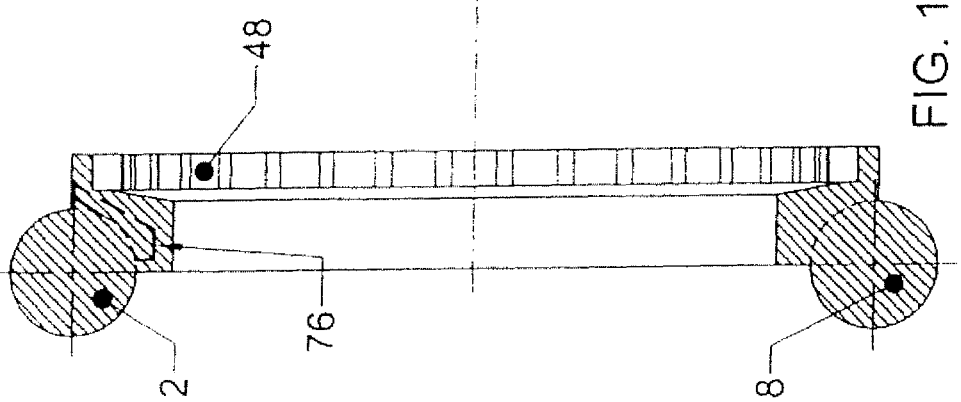
FIG. 11 is a schematic sectional view of a ring gear assembly as taken in cutaway fashion by line C-C in FIG. 10.

FIG. 11 is a schematic sectional view of a ring gear assembly 48, as taken in cutaway fashion by line C-C in FIG. 10. FIG. 12 is another schematic illustration of the ring gear assembly shown in FIG. 4, with revolving pistons 3 and 9 and schematic ring gear 49, again further shown with internal gear teeth. A pair of schematically illustrated openings, at 78 and 79, connect a space between the revolving piston and revolving cylinder head to the pair of ports 26 and 27 (see again FIG. 4).

Referring to FIG. 13, a schematic sectional view is again shown of the ring gear assembly 49 in FIG. 12, in cutaway along line D-D. FIG. 14 is a schematic representation of an equivalent revolving piston engine, such as shown in FIG. 4 and according to a further variant showing a probable gear arrangement and direction of motion of various main components. Of note, similar identification numbers are used for various items corresponding to that illustrated in FIG. 4. The ring gears are further exhibited as having external gear teeth.

The elliptical gears that are mounted on axes 55 and 58, in reference to FIG. 14 and further shown in FIG. 15, which is a sectional illustration of an elliptical gear pair 54 and 56 rigidly connected to the circular gears 53 and 57. The axes 55 and 58 are again identical to that shown in FIG. 14.

Figure 16:
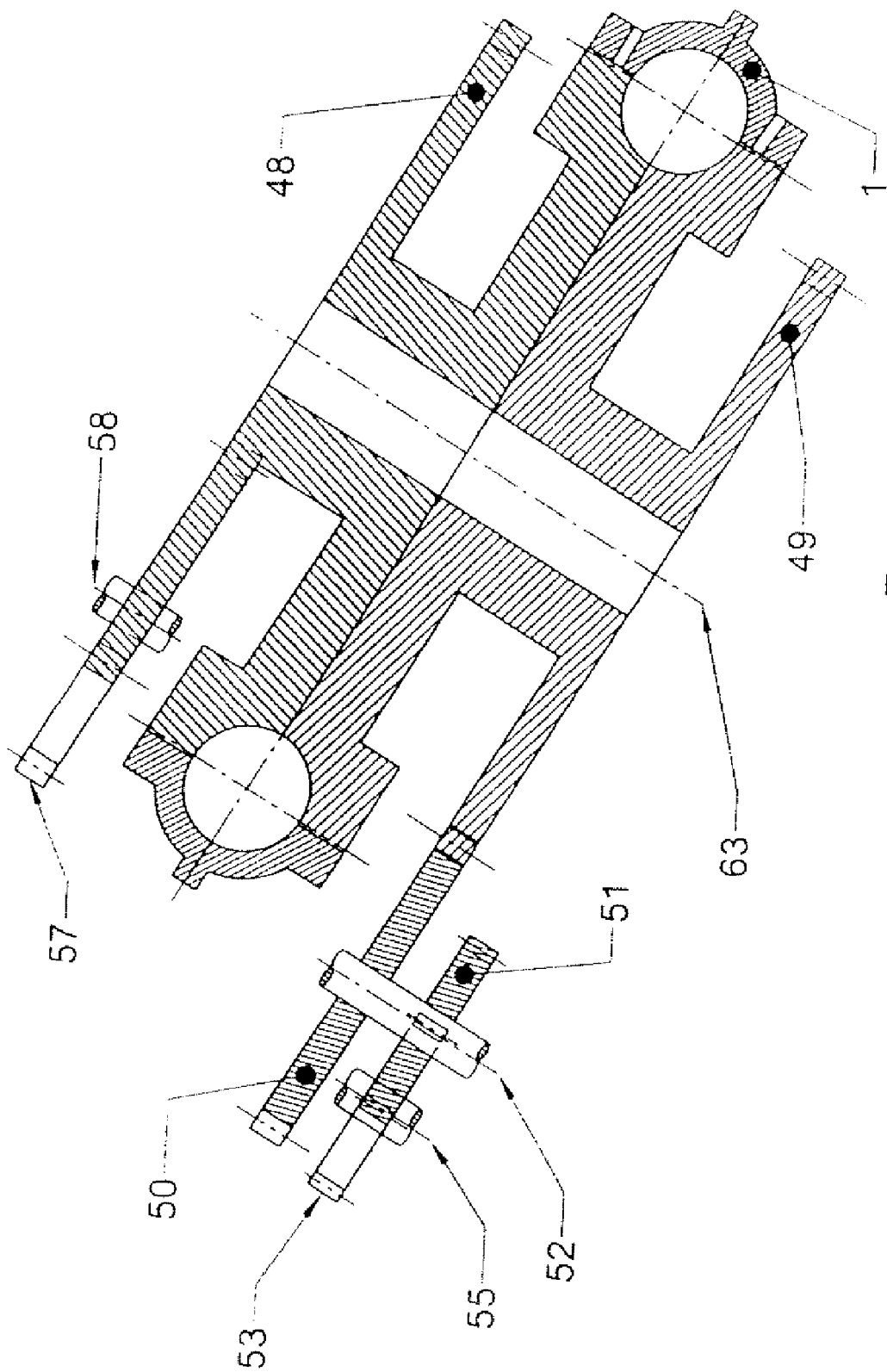
FIG. 16 is a cutaway view taken along line E-E of FIG. 14 and showing a schematic arrangement for another variant with ring gear assemblies having external gear teeth and various components and various gears associated with the present design, related elliptical gears being mounted on axes not being shown in the figure.

FIG. 16 is a cutaway view taken along line E-E of FIG. 14 and showing a schematic arrangement of various components and various gears associated with the present variant of the design. Relative elliptical gears are further understood as being mounted on axes 55 and 58, not being shown in the figure.

Figure 17:
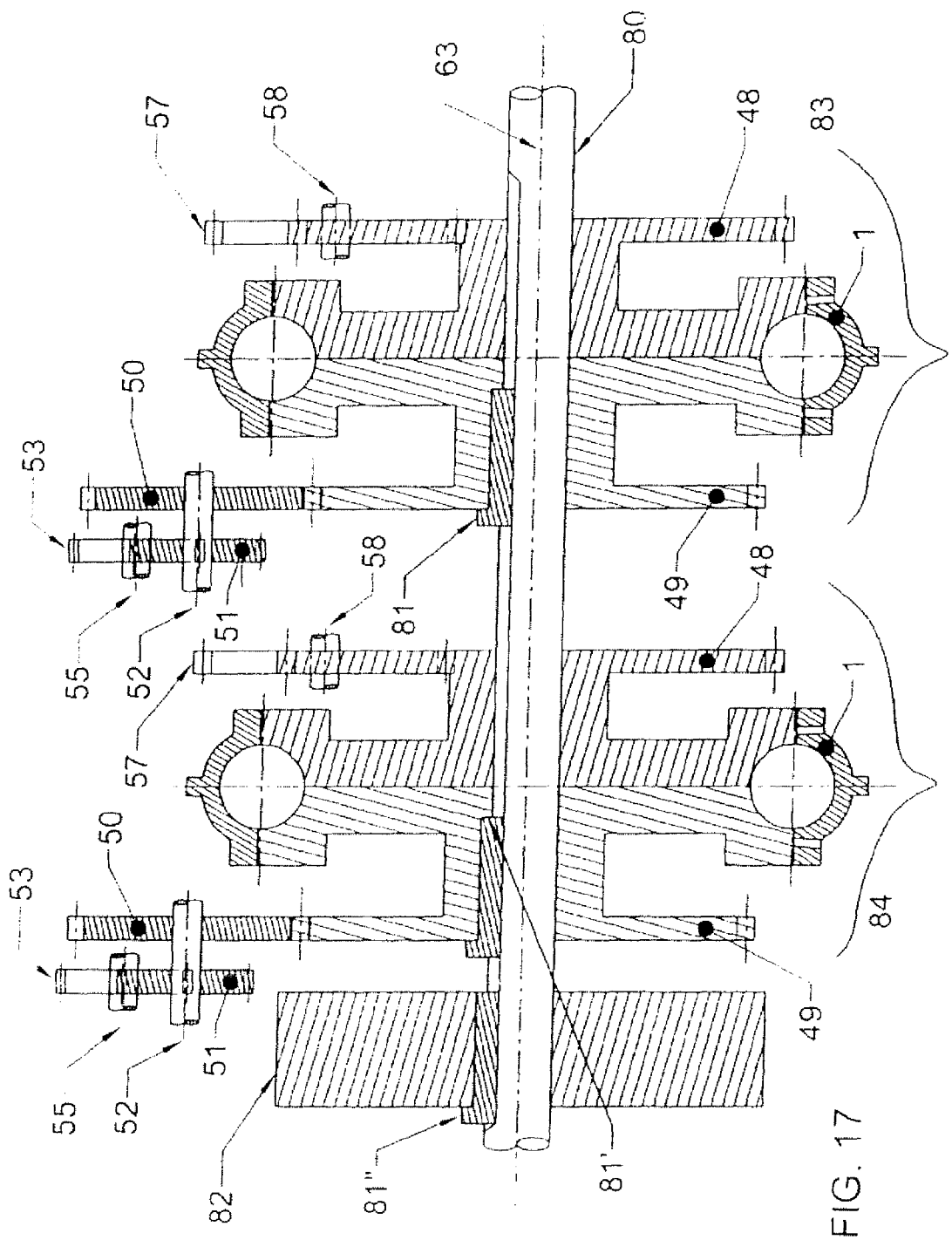
FIG. 17 is a cutaway view of a plurality of revolving piston engines mounted to a common output shaft.

FIG. 17 schematically shows two engines, 83, 84, such as shown in singular fashion in FIG. 16, and which has external teeth on its ring gears, which are mounted on a common output shaft 80 with a common axis 63. Also shown is a schematic flywheel 82 fixed with the help of a key 81" to the same common output shaft 80. The two engines 83 and 84 are fixed to the output shaft 80 with the help of keys 81 and 81' in such a way that the revolving ring gear assembly 49 of each individual engine 83, 84 is fixed to the common output shaft 80 and the ring gear assemblies 48 of the individual engines are free to rotate with respect to the output shaft 80.

Figure 18:
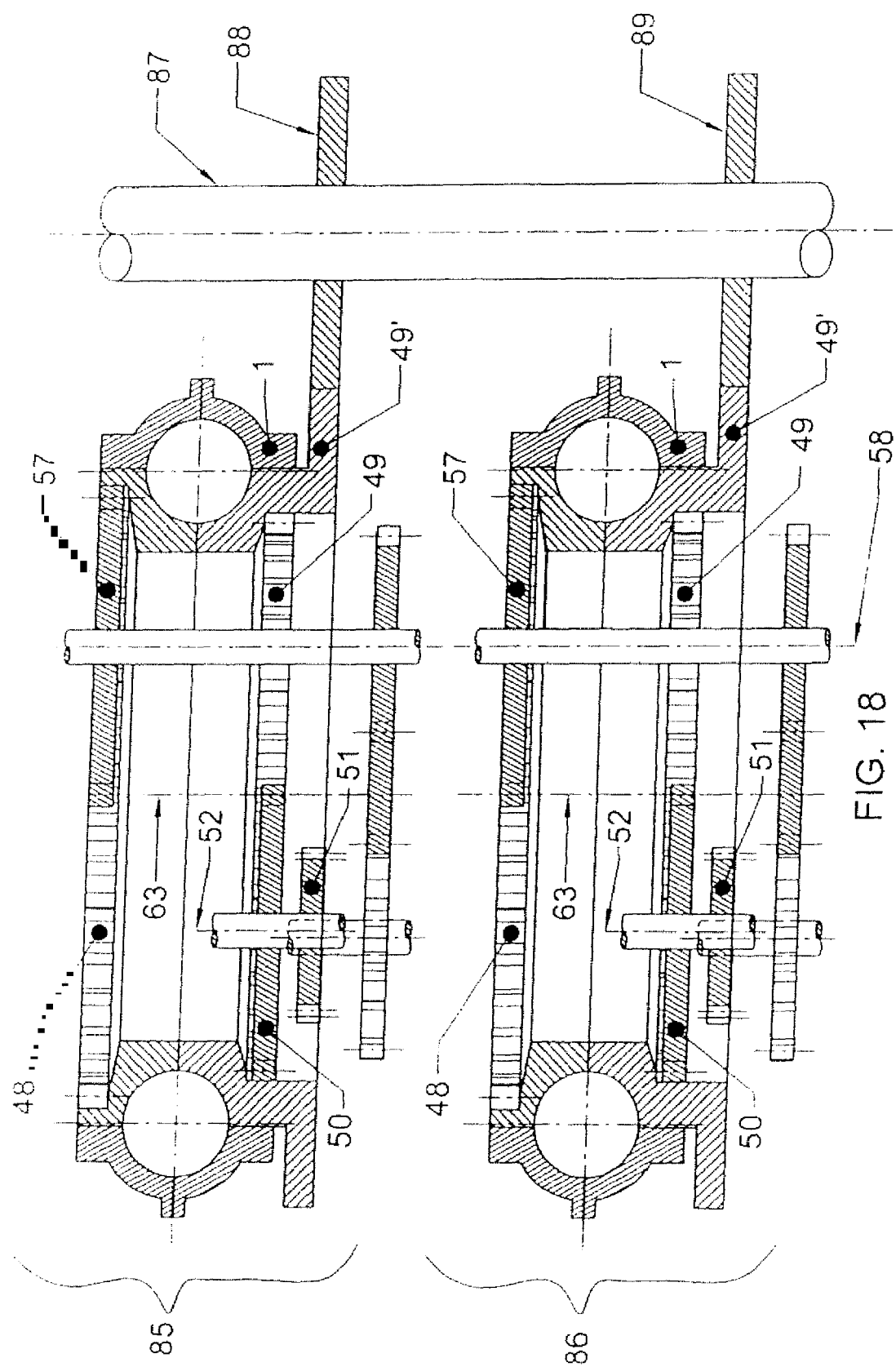
FIG. 18 is an alternate mounting arrangement of the pair of engines shown in FIG. 17.

Referring to FIG. 18, schematically shown are two engines 85, 86, such as shown in FIG. 5, having internal teeth on their ring gears, mounted on a common output shaft 87. The ring gear assembly of the individual engines is slightly modified with addition of a coaxial gear rim 49' with external teeth. The gear rims 49' of individual engines are meshing with spur gears 88 and 89 respectively which in turn are coaxially fixed to a common output shaft 87, the shaft extending in a crosswise and as opposed to coaxial, fashion relative to the engines 85, 86. The arrangement of multiple engines with a common shaft can be modified in further arrangements according to a person skilled in the art.

A spark plug is also mounted on the revolving piston according to one of ordinary skill in the art. A comparison with the conventional reciprocating piston engine can explain it more easily. In a conventional reciprocating piston engine the spark plug is mounted on the cylinder head. Analogous to this a spark plug can be mounted on a revolving piston as it works as a revolving cylinder head. As to routing the electrical cables to the moving spark plug, many DC electrical motors provide connections made to moving armature coils. This known, it is readily understood that similar methods can be used for supplying electrical current to the moving spark plugs of the present invention.

Sequence of Operation:

For purposes of ease of illustration, the gear teeth for all the gears are not automatically shown. Rather, and in specific instances, only pitch circles and pitch ellipses are shown for easy understanding. Referencing again the piston and cylinder head pair 3 and 2, in FIG. 1 and in FIG. 4, the pitch ellipses 31 and 29 are shown separately for easy understanding, otherwise elliptical gears 56 and 54 have similar pitch ellipses as represented by 31 and 29, and all have the same eccentricity.

In this fashion, the curve illustrated in FIG. 3 is equally applicable for the elliptical gear pair 56, 54. Referencing again FIG. 3, a portion 43 of the curve, when the speed ratio, neglecting the negative sign, is less than unity, the elliptical gear 56 rotates slower than the elliptical gear 54, and thus the ring gear-2 and the cylinder head 2 revolves at a slower speed than the speed of revolution of the ring gear-1 and the piston 3.

Thus, a volume between the faces 4 and 6 keeps on increasing for that portion 43 of the FIG. 3, while revolving in the direction as shown by 28. The positions of the piston and the cylinder head at the start of the portion 43 of the curve in FIG. 3 are represented by 3 and 2, and that at the end of portion 43 is represented by 17 and 16, in FIG. 1, respectively.

Similarly the other pair of piston and the cylinder head at position 9 and 8 at the start of portion 43 attains the positions 21 and 20 respectively, at the end of portion 43 in FIG. 3. The positions of the pistons and cylinder heads at the end of portion 43 are the starting positions for a succeeding portion 44 in FIG. 3. At the end of the further portion 44 in FIG. 3, the piston 3 attains a position of piston 9, whereas piston 9 attains the position of piston 3. Similarly, cylinder head 2 attains the position of cylinder head 8, whereas cylinder head 8 attains position of cylinder head 2 as again represented in FIG. 1.

Further succeeding portion 45 in FIG. 3 is equivalent to the portion 43, with the piston-cylinder head pairs 3, 2 and 9, 8 having interchanged their respective positions. Similarly, the ending and beginning portions 46 and 47 together are similar to the portion 44, with piston-cylinder head pair 3, 2 attaining positions at 21, 20 respectively at the start of the portion 46 and again attaining positions 3, 2 at the end of portion 47. Similarly, pair 9, 8 attain positions 17, 16 at the start of portion 46 and again attain positions 9, 8 at the end of the portion 47 respectively. The cycle continues to repeat for further revolutions of the ring gears and, thus for one complete revolution of a piston and cylinder head, the elliptical gears require two complete revolutions.

For simplicity, a piston-cylinder head pair 3, 2 is generally called a first pair and the pair 9, 8 is called the second pair (see again FIG. 1). In FIG. 3, the portion 43 represents the power stroke for first pair and at the same time intake stroke for the second pair. Similarly, portion 44 represents exhaust stroke for first pair and compression stroke for the second pair; portion 45 represents intake stroke for first pair and power stroke for the second pair and, finally, portions 46 and 47 together represent compression stroke for first pair and exhaust stroke for the second pair.

In a preferred application, fuel ignition should take place appropriately after start of the portion 43 or portion 45 for the respective pair. The time delay between start of the portion 43 or 45 and the fuel ignition is to be selected very appropriately and can be varied with engine speed. As the ignition takes place, in the confined space between faces 4 and 6 or in a specially designed combustion chamber outside the confined space, at the time of ignition as stated above, pressure is developed between the two faces forcing them to move apart. Any motion after start of portion 43 or 45, in the direction opposite to 28 will cause the two faces to come closer, this will increase the pressure between the two faces, which is difficult unless the two faces are forced externally to rotate against direction 28.

Thus, and in the absence of sufficient external forces, the piston 3 and the cylinder head 2 will continue to rotate in the direction 28 (again FIG. 1), by the pressure developed by the ignition of fuel, thus increasing the volume between the two faces 6 and 4. In this fashion, the ignition of fuel (the power stroke) will force the piston and thus the ring gear-1 to rotate in the direction 28.

It should be noted that, in portions 43 and 45 (again FIG. 3), the volume expansion between the faces 6 and 4 is possible only if the two ring gears rotates in the direction 28, which is same as direction 59. As the ring gear-2 and thus the cylinder heads are driven by the ring gear 1, the cylinder head follows the piston in the direction 59 keeping the speed relationship with the piston as constrained by the curve as shown in FIG. 3.

During the power stroke (again portion 43), the ring gear-2 and thus cylinder heads revolve slower than the piston and the ring gear-1. During the exhaust stroke, the portion 44, the ring gear-2 and the cylinder heads revolve faster than the ring gear-1 and pistons, thus forcing the product of combustion out through the exhaust port. During the intake stroke, the portion 45, the cylinder heads again revolve slower than the pistons thus increasing the volume between the faces 4 and 6 and thus sucks in the air or air fuel mixture through intake port. During the compression stroke (the portions 46 and 47 together), the cylinder heads revolve faster than the pistons, and thus reduces the volume between the faces 4 and 6 compressing the air or air fuel mixture and thus making it ready for combustion in power stroke.

The above explained cycle repeats for other piston-cylinder head pair 9, 8 keeping 180° phase difference with the pair 3, 2. The faces 12 and 10 in pair 9, 8 are corresponding to the faces 6 and 4 in pair 3, 2. Furthermore, the portions 43, 44, 45, 46 and 47 in FIG. 3 illustrate the zones for ideal strokes for the revolving piston internal combustion engine; the actual start and end of a stroke being decided after considering dynamics of engine, fuel characteristics and many other parameters. It is also understood that appropriate intake and exhaust valves can replace the intake and exhaust ports.

Additional preferred embodiments contemplate incorporating more pairs of piston and cylinder head for one ring cylinder, alternatively there can be provided a single tandem arrangement of piston and cylinder head for one ring cylinder. The mechanism that uses elliptical gears can be replaced by some other mechanism that can give desired variation in the speed of the cylinder head for constant piston speed; one such mechanism could be an appropriate four bar linkage operating as a double crank mechanism (as again previously described in FIGS. 7 and 8).

Calculation for the Compression Ratio:

As disclosed in FIG. 1, the volume between faces 4 and 6 can be assumed as the clearance volume analogous to the reciprocating piston engine, as piston at 3 and cylinder head at 2 are in positions equivalent to the TDC in a conventional reciprocating piston engine. The volume between faces 18 and 19 can also be taken as expanded volume, as the piston 3 in position 17 and cylinder head 2 in position 16 are equivalent of BDC in conventional reciprocating piston engine. Similarly, a volume between faces 10 and 12 is considered clearance volume for another pair of piston 9 and cylinder head 8, and the volume between faces 22 and 23 is an expanded volume as positions 21 and 20 are the BDC equivalent position for the piston 9 and cylinder head 8 respectively.

The compression ratio (CR) is the ratio of volume between laces 19 and 18 to that between faces 6 and 4.

In other words CR=(angle from 18 to 19)/(angle from 4 to 6);

CR=((angle from 15 to 25)−(angle from 14 to 24)+(angle from 4 to 6))/(angle from 4 to 6)

All the angles mentioned above are measured in the direction 28.

The angle from angular locations 15 to 25 (see again FIG. 1) is the ratio of rotation of elliptical gear 29 for the portion 43 to the speed ratio between elliptical gear and the ring gear-1. Similarly, angle from angular locations 14 to 24 is the ratio of rotation of elliptical gear 31 for the portion 43 to the speed ratio between elliptical gear and the ring gear-2.

These angles can be calculated from the geometry of the pitch ellipse as shown in FIG. 2. The pitch ellipse used for the elliptical gears is having length of major axis (distance from 35 to 37 or 37 to 66) as 80 units and length of minor axis (distance from 64 to 67 or 65 to 68) as 74 units, thus the eccentricity is 0.3799671. For the TDC position, the two elliptical gears are shown by 33 and 34, having the instantaneous speed ratio between them as unity and thus in this position length between 32 and 69 is equal to the length between 30 and 69. Here 30 and 32 are the focal points of the respective ellipses and 69 represent the point of contact of the two pitch ellipses.

As the speed ratio between elliptical gears to ring gears is 2:1 and the pitch ellipses are symmetrical about their major and minor axes.

Angle from 15 to 25=angle between lines 38-30 and 30-66

OR angle from 15 to 25=angle between lines 65-30 and 30-66=112.332°

Similarly,

Angle from 14 to 24 = Angle between lines 36-32 and 32-37

= Angle between lines 64-32 and 32-35 = 67.668°

If we have clearance angle as 4°, then CR=(112.332−67.668+4)/(4)=12.163

If the clearance angle is changed to 5° then for the same engine the CR becomes (112.332−67.668+5)/(5)−9.9328

Thus, it can be seen that just by changing the clearance angle the CR can be changed very easily. The CR can also be changed easily by selecting pitch ellipses with different eccentricity. It can be seen that lower the eccentricity of pitch ellipses, lesser is the CR obtained. It is to be noted here that, for the calculations faces 4, 6, 18, 19, etc. are assumed to be planer faces and the planes of the faces pass through the common axis of revolution.

Calculation for Output Power:

The volume between faces 3 and 2 acts as the active volume. After TDC the charge between faces 3 and 2 is ignited. As the result of combustion, the pressure between the faces 3 and 2 increases and forces the volume between the faces to increase and thus forces the ring gears to rotate in CCW direction as shown in FIG. 4. The theoretical power generated can be calculated with the standard power generation equation:

$$W = \int_{CV}^{CV*CR} p \cdot dv$$

Where:
W=Work done OR power generated,
CV=clearance volume,
CR=compression ratio.
p=pressure of the active volume,
v=volume of the active volume.

In practice, some power is always lost in compressing the air or air-fuel mixture in the active volume. Some additional quantum of power is also lost in accelerating and decelerating the ring gear-2 assembly, supporting the revolving cylinder heads and associated linkages. The loss of power in acceleration and deceleration depends upon the total mass and inertia of the components undergoing speed variation. Given this, it is advisable to keep the mass and the inertia of such parts to a minimum as to reduce the losses. The difference between the power generated and the power lost becomes available for utilization outside the engine.

Advantages of the Revolving Piston Engine:

Given the above description, the following bullet list identities the advantages associated with the present inventions, and which are as follows:

1. The revolving piston engine does not have exhibit any reciprocating part.
2. The engine is suitable for use with all types of fuels and different ignition methods, and such as which are also used in reciprocating piston engine. As disclosed herein, the combustion chamber can also be designed outside the ring cylinder.
3. Use of ports for intake and exhaust are possible instead of valves to operate, this rendering the engine more robust. Thus, and in this way, a four stroke engine can be made to work with ports.
4. During the active combustion cycle, and while the products of combustion expand, the active volume between the corresponding laces of the piston and cylinder head revolves in the ring cylinder; thus creating a revolving heat source making cooling easy and efficient, and in addition providing increased surface area available for cooling.

5. A large portion of the ring cylinder is fixed making it suitable for easy cooling by liquid coolant or any other cooling method.
6. A same ring cylinder can accommodate one to many pairs of pistons and cylinder heads, thus allowing higher power generation possible for approximately a same physical size of engine. This aspect also allows higher power to weight ratio obtainable, with less modification.
7. Vibration levels will be very low, as the reciprocating components are absent and the pistons and cylinder heads can be arranged in such a way that they balance other pistons and cylinder heads within the same ring cylinder.
8. The engine can be used as an engine module. Similar engines can be put together in parallel with a common output shaft (e.g. scalability); thus it is easy to increase power output without much change in the design.
9. it is possible to use multiple engines at a time with a common output shaft to make an equivalent of multi-cylinder reciprocating piston engine. The engine can be designed for ease of interchangeability and thus making it possible to keep an engine as a spare and use it to replace a faulty engine in emergency with ease and with minimum down time required for the engine repair.
10. While using multiple engines, it is possible to arrange the different engines on same output shaft in a way as to have a power stroke in one engine overlapping compression stroke in other engine, for obtaining smooth power output and thus possibly reducing the size of the flywheel.
11. Instead of elliptical gear pair, it is also envisioned that some other mechanism can be used to obtain desired differential velocity for the two ring gears supporting the pistons and cylinder heads. An ideal differential velocity pattern is that which will give maximum separation between the revolving piston and revolving cylinder head during power and intake strokes with minimum acceleration and deceleration, keeping the clearance volume to a minimum.
12. It is possible, in an alternate variant, to use the space between faces 7, 11 and faces 13, 5 for pre-compression of the separately filled air or air fuel mixture during intake stroke or power stroke, and supplying it to the active volume between 6, 4 and 12, 10 appropriately during compression stroke. This can be used to increase the output power, as in super charging of the engine.
13. A very compact engine can be made as it contains less number of parts.
14. It can be suitably designed to have less down time while repairing the engine.
15. The ring cylinder can have any suitable cross-section as required for easy manufacture and assembly.
16. The engine's expected life is longer as it has no reciprocating part and very effective cooling is possible. The engine heating is less because of revolving active volume.
17. It is possible to mount spark plug on to the piston itself to have better control on the ignition timing and thus eliminating the need of separate combustion chamber.
18. It is very easy to use this principle to develop a revolving piston compressor for that the ports or the valves are to be appropriately designed and relocated. In such applications, and referring again to the graph of FIG. 3, portions 44, 46 and 47 are used for compression strokes and portions 43 and 45 are used for intake strokes. The input power is to be supplied to the ring gear-1.
19. The revolving piston can additionally be adapted for application to newly developing steam engine technologies.
20. The pistons and cylinder heads can be arranged in equispaced fashion to their respective assemblies for better balancing of the engine.
21. In certain applications, the internal gear arrangement in use with the outer ring gear can be substituted by external gears.

Having described my invention, other and additional preferred embodiments will become apparent to those skilled in the art to which it pertains, and without deviating from the scope of the appended claims.

I claim:

1. A non-reciprocating and revolving piston engine, comprising:
a ring cylinder having a fixed part and coaxially rotating parts;
said rotating part further including a pair of coaxial ring gear assemblies revolving at different angular speeds about a common axis passing through a center of said ring cylinder and while completing a single revolution in simultaneous fashion;
a coupling and control mechanism mounted on fixed axes for interengaging said ring gear assemblies in order to regulate a differential angular speed established therebetween;
at least one revolving piston and at least one further revolving cylinder head mounted to said ring gear assemblies and arranged in opposing and seating fashion within said ring cylinder;
an output shaft connected to at least one of said ring gear assemblies for delivering a rotating power output;
a single pair of elliptical and eccentrically rotating gears for maintaining a varying speed ratio between said revolving pistons and cylinder heads, said meshing elliptical gears revolving around respective axes that pass through respective geometric focus points of respective pitch ellipses;
at least one of said ring gear assemblies being interiorly toothed and connected with a first spur gear with a fixed axis;
a coaxially positioned gear rigidly connected to said first spur gear and operative to drive a second spur gear and to which is rigidly connected a selected one of said elliptical gears, a rotating axis of said second spur gear passing through a focus of a pitch ellipse of said selected elliptical gear;
said selected elliptical gear driving said other elliptical gear which has its fixed axis of rotation passing through the focus of the pitch ellipse, said other selected elliptical gear in turn being rigidly connected to a third spur gear in turn driving said rotating part of said ring cylinder.

2. The invention as described in claim 1, where said at least one of said ring gear assemblies includes a first ring gear assembly and a second ring gear assembly where said first ring gear assembly further comprising a first ring gear exhibiting at least one of a plurality of interiorly or exteriorly applied teeth, said second ring gear assembly further comprising a second ring gear with a further plurality of opposing arrayed teeth.

3. The invention as described in claim 1, further comprising said pistons and mating cylinder heads exhibiting specified shapes and sizes, a spacing established between said rotating pistons and cylinders determining a pre-compression of an air fuel mixture.

4. The invention as described in claim 1, further comprising a spark plug mounted to at least one of said revolving pairs of pistons and cylinder heads.

5. The invention as described in claim 1, further comprising a flywheel connected to at least one of said revolving pairs of pistons and cylinder heads.

6. The invention as described in claim 1, further comprising an intake port and an exhaust port communicating with said fixed part of said ring cylinder.

7. The invention as described in claim 1, further comprising said at least one revolving piston and at least one further cylinder head piston comprises pairs of pistons and cylinder heads defining integral portions of an internally and coaxially rotating part of said ring cylinder.

8. The invention as described in claim 1, said elliptical gears having a specified shape and size and requiring two complete revolutions for a single revolution of said pistons and cylinder heads.

9. A non-reciprocating and revolving piston device, comprising:
a ring cylinder having a fixed part and a coaxially rotating part;
said rotating part further comprising a pair of coaxial ring gear assemblies revolving about a common axis passing through a center of said ring cylinder and while completing a single revolution in simultaneous fashion wherein one of the said ring gear assembly drives the other said ring gear assembly through positive drive that include coupling and control mechanism;
the said coupling and control mechanism mounted on fixed axes for interengaging said ring gear assemblies in order to regulate a varying relative angular speed established therebetween;
the said control mechanism further comprising pair of meshing elliptical and eccentrically rotating gears for maintaining a varying speed ratio between said ring gear assemblies, said meshing elliptical gears revolving around respective axes that pass through respective geometric focus points of respective pitch ellipses;
at least one revolving piston mounted to one of the said ring gear assemblies, and at least one further revolving cylinder head mounted to the other said ring gear assembly and arranged in opposing and seating fashion within said ring cylinder; and
a shaft connected to at least one of said ring gear assemblies as to deliver a rotating power from the ring gear assembly or to the ring gear assembly wherein the shaft is used as output shaft for delivering a rotating power output from the ring gear assembly or used as input shaft for delivering a rotating power input to the ring gear assembly at least one of said ring gear assemblies being interiorly toothed and connected with a first spur gear with a fixed axis;
a coaxially positioned gear rigidly connected to said first spur gear and operative to drive a second spur gear and to which is rigidly connected a selected one of said elliptical gears, a rotating axis of said second spur gear passing through a focus of a pitch ellipse of said selected elliptical gear:
said selected elliptical gear driving said other elliptical gear which has its fixed axis of rotation passing through the focus of the pitch ellipse, said other selected elliptical gear in turn being rigidly connected to a third spur gear in turn driving said rotating part of said ring cylinder.

10. The invention as described in claim 9, where said at least one of said ring gear assemblies includes a first ring gear assembly and a second ring gear assembly where said first ring gear assembly further comprising a first gear exhibiting at least one of a plurality of interiorly or exteriorly applied teeth, said second ring gear assembly further comprising a second gear with a further plurality of interiorly or exteriorly applied teeth.

11. The invention as described in claim 9, further comprising said at least one revolving pistons and mating said at least one revolving cylinder heads exhibiting specified shapes and sizes, a spacing established between said at least one revolving pistons and said at least one revolving cylinder head determining a pre-compression of contents of the said space.

12. The invention as described in claim 9, further comprising a spark plug mounted to at least one of said revolving pairs of pistons and cylinder heads.

13. The invention as described in claim 9, further comprising a flywheel connected to at least one of said revolving pairs of pistons and cylinder heads.

14. The invention as described in claim 9, said at least one revolving piston further comprising a plurality of revolving piston devices arranged in displaced and interconnected fashion about a common output shaft.

15. The invention as described in claim 9, further comprising an intake port and an exhaust port communicating with said fixed part of said ring cylinder.

16. The invention as described in claim 9, further comprising said at least one revolving piston and at least one cylinder head piston comprises pairs of pistons and cylinder heads defining integral portions of an internally and coaxially rotating part of said ring cylinder.

17. The invention as described in claim 9, said coupling and control mechanism comprising said pair of meshing elliptical and eccentrically rotating gears having a specified shape and size and requiring two complete revolutions for a single revolution of said pistons and cylinder heads.

18. The invention as described in claim 9 that is used to make a revolving piston internal combustion engine; wherein varying space between said revolving piston and said revolving cylinder head utilized as equivalent of intake stroke, compression stroke, power stroke and the exhaust stroke; wherein fuel is ignited within the said varying space near the start of relative separation between said revolving piston and revolving cylinder head.

19. The device as claimed in claim 9, further comprising said shaft operating as said input shaft for delivering a rotating power input to said at least one of the said ring gear assemblies.

20. A non-reciprocating and revolving piston device, comprising:
a ring cylinder having a fixed part and a coaxially rotating part;
said rotating part further comprising a pair of coaxial ring gear assemblies revolving about a common axis passing through a center of said fixed part and while completing a single revolution, at least one of said ring gear assemblies being interiorly toothed and connected with a first spur gear with a fixed axis;
a coupling and control mechanism mounted on said fixed axes and causing a first of said ring gear assemblies to drive the other of said ring assemblies through a positive drive in order to regulate a varying relative angular speed established therebetween;
said control mechanism further comprising a pair of meshing elliptical and eccentrically rotating gears for maintaining a varying speed ratio between said ring gear assemblies, said meshing elliptical gears revolving around respective axes that pass through respective geometric focus points of respective pitch ellipses;
a coaxially positioned gear rigidly connected to said first spur gear and operative to drive a second spur gear to which is rigidly connected a selected one of said elliptical gears, a rotating axis of said second spur gear passing through a focus of a pitch ellipse of said selected elliptical gear;

said selected elliptical gear driving said other elliptical gear which has its fixed axis of rotation passing through the focus of the pitch ellipse, said other selected elliptical gear in turn being rigidly connected to a third spur gear in turn driving said rotating part of said ring cylinder;

at least one revolving piston mounted to one of said ring gear assemblies, at least one revolving cylinder head mounted to the other of said ring gear assemblies and arranged in opposing and seating fashion within said ring cylinder; and an output shaft connected to at least one of said ring gear assemblies for delivering a rotating power output.

\* \* \* \* \*